(12) United States Patent  
Kim et al.

(10) Patent No.: US 8,351,762 B2  
(45) Date of Patent: Jan. 8, 2013

(54) ADAPTIVE MEDIA PLAYOUT METHOD AND APPARATUS FOR INTRA-MEDIA SYNCHRONIZATION

(75) Inventors: Jong-Won Kim, Gwangju (KR); Sang-Hoon Park, Gwangju (KR)

(73) Assignee: Gwangju Institute of Science and Technology, Gwangju (KR)

( * ) Notice: Subject to any disclaimer, the term of this patent is extended or adjusted under 35 U.S.C. 154(b) by 1312 days.

(21) Appl. No.: 12/034,360

(22) Filed: Feb. 20, 2008

(65) Prior Publication Data

US 2008/0205856 A1 Aug. 28, 2008

(30) Foreign Application Priority Data

Feb. 22, 2007 (KR) .......................... 10-2007-0017996

(51) Int. Cl.
*G11B 27/00* (2006.01)
(52) U.S. Cl. ........................................ 386/290; 386/201
(58) Field of Classification Search .................... 386/201
See application file for complete search history.

(56) References Cited

U.S. PATENT DOCUMENTS

| 6,356,664 B1* | 3/2002 | Dunn et al. ................ 382/239 |
| 2005/0190794 A1* | 9/2005 | Krause et al. ............. 370/485 |
| 2005/0243846 A1* | 11/2005 | Mallila ....................... 370/412 |
| 2007/0091917 A1* | 4/2007 | Schoenblum ............. 370/464 |

* cited by examiner

*Primary Examiner* — David Garcia Cervetti  
*Assistant Examiner* — Ghazal Shehni

(57) ABSTRACT

Disclosed is a buffer-based adaptive media playout method in a receiver side of a network media streaming system. The method includes: calculating a playout interval for playing out a current j-th frame (where j is a natural number) of a received media stream; and playing out the current j-th frame after the calculated playout interval has elapsed from the reception of the current j-th frame. The calculation of the playout interval for playing out the current j-th frame of the received media stream includes: calculating a buffer level of a (j+w)-th frame (where w is a natural number); estimating a playout pause or a playout skip on the basis of the calculated buffer level; and calculating the playout interval for playing out the current j-th frame for the predicted one of the playout pause and the playout skip. According to the above-mentioned structure, it is possible to reduce the amount of temporal distortion, such as the RMSE value of playout discontinuity due to delay or jitter, as compared to the buffer-threshold-based media playout techniques according to the related art.

11 Claims, 14 Drawing Sheets

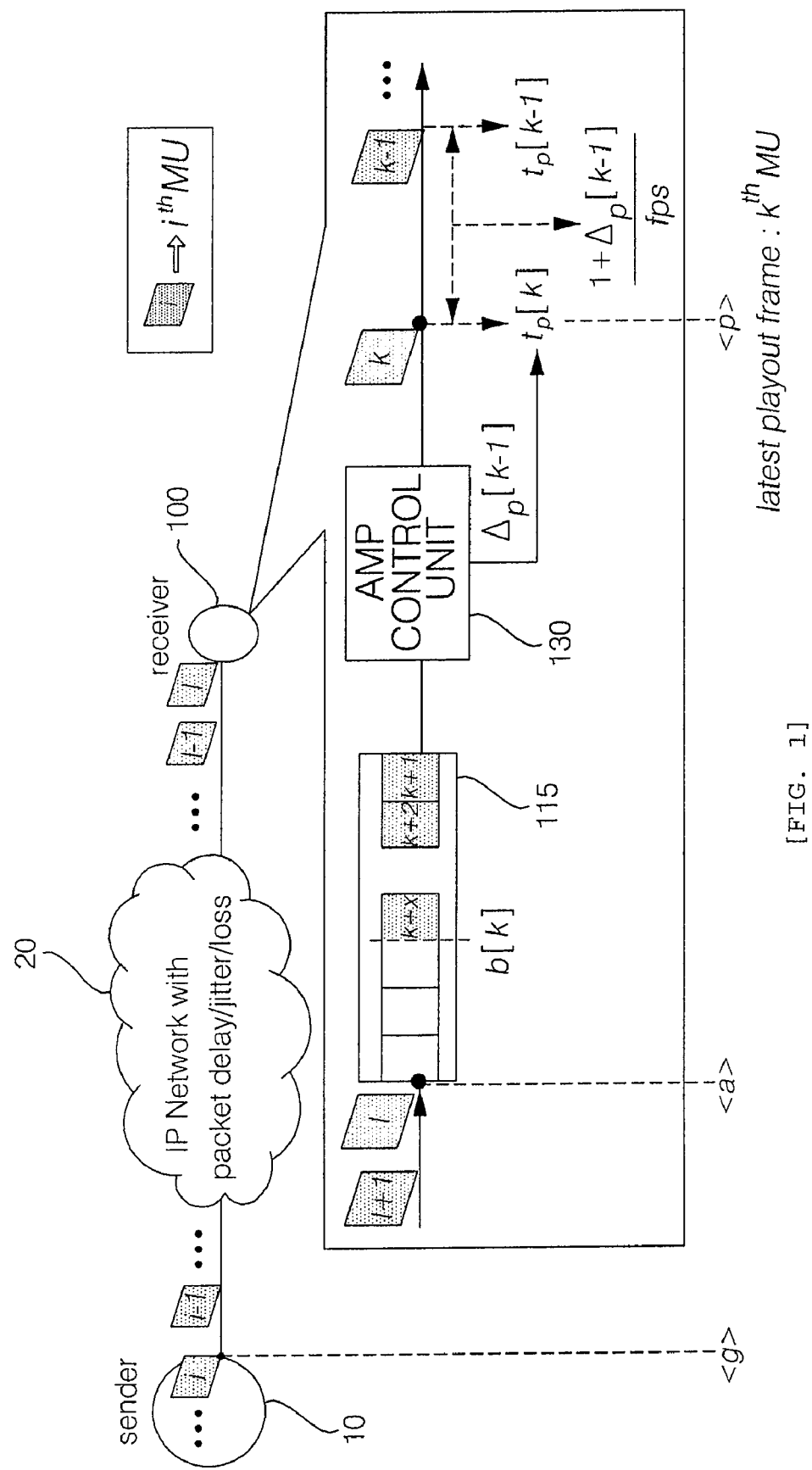
[FIG. 1]

[FIG. 2]
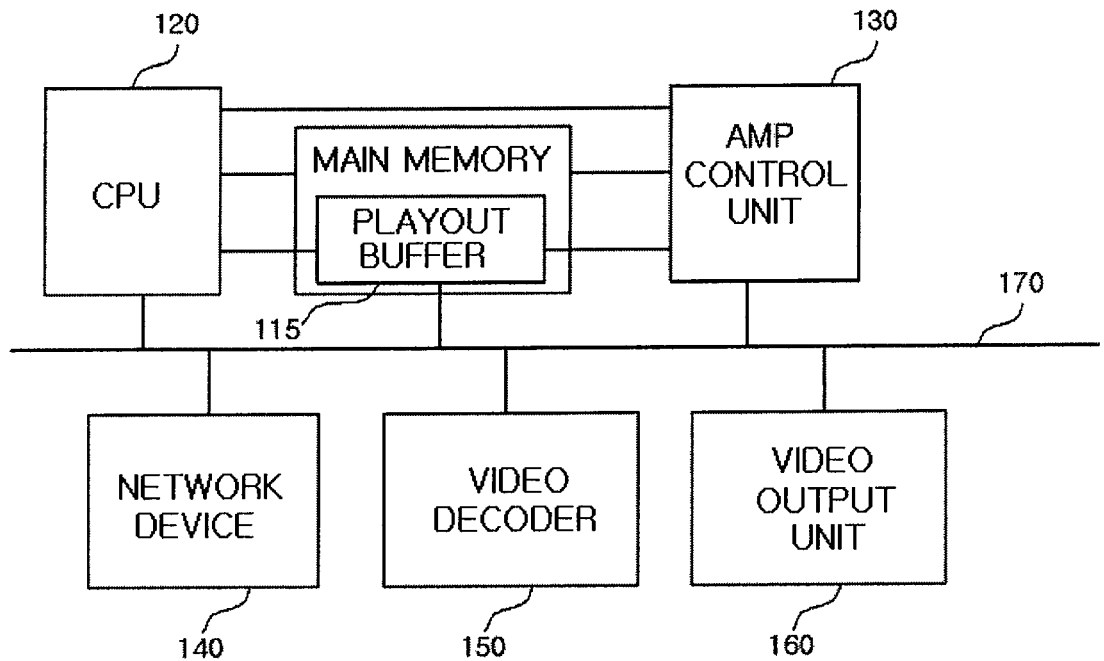
[FIG. 3]
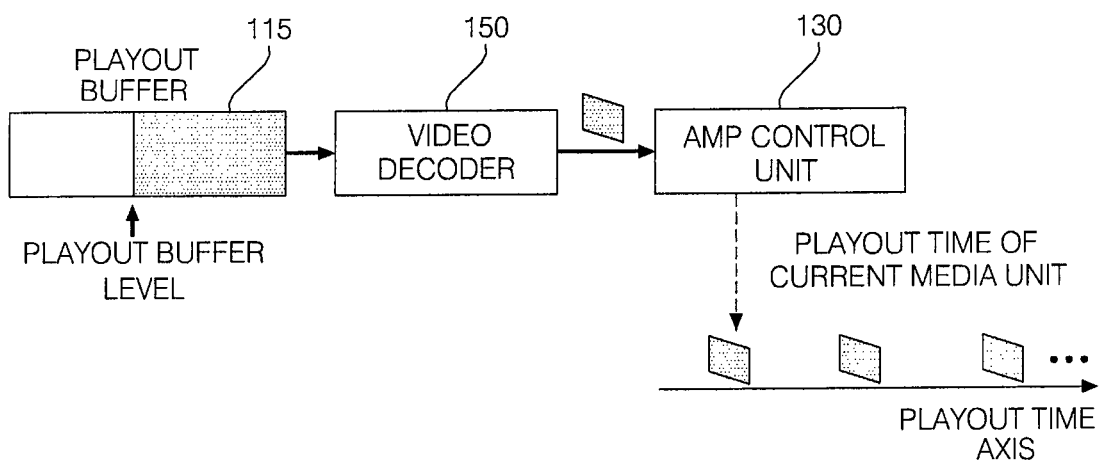

[FIG. 4]
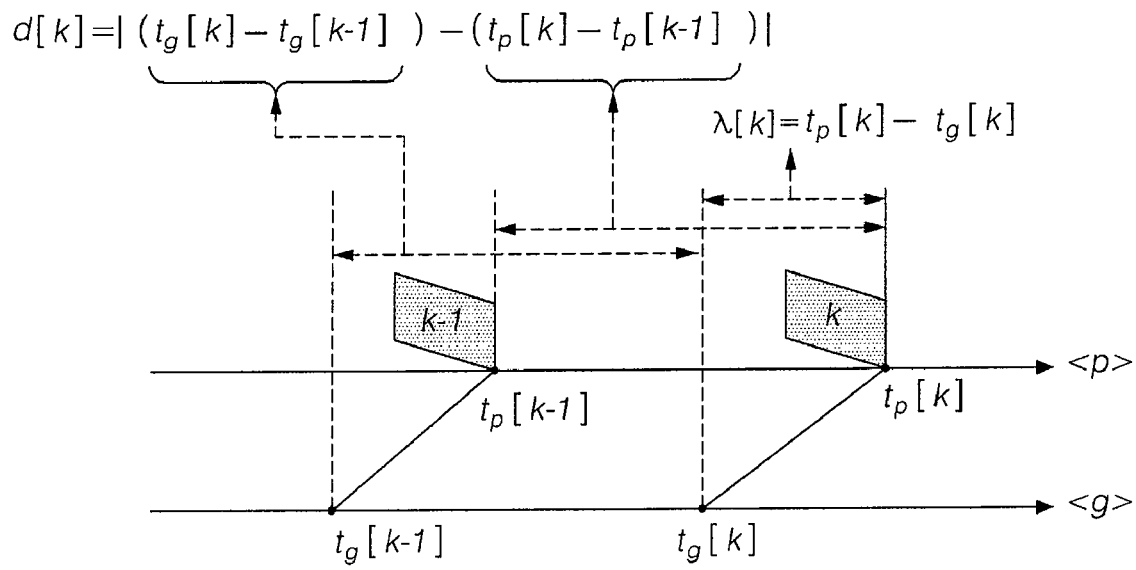
[FIG. 5]
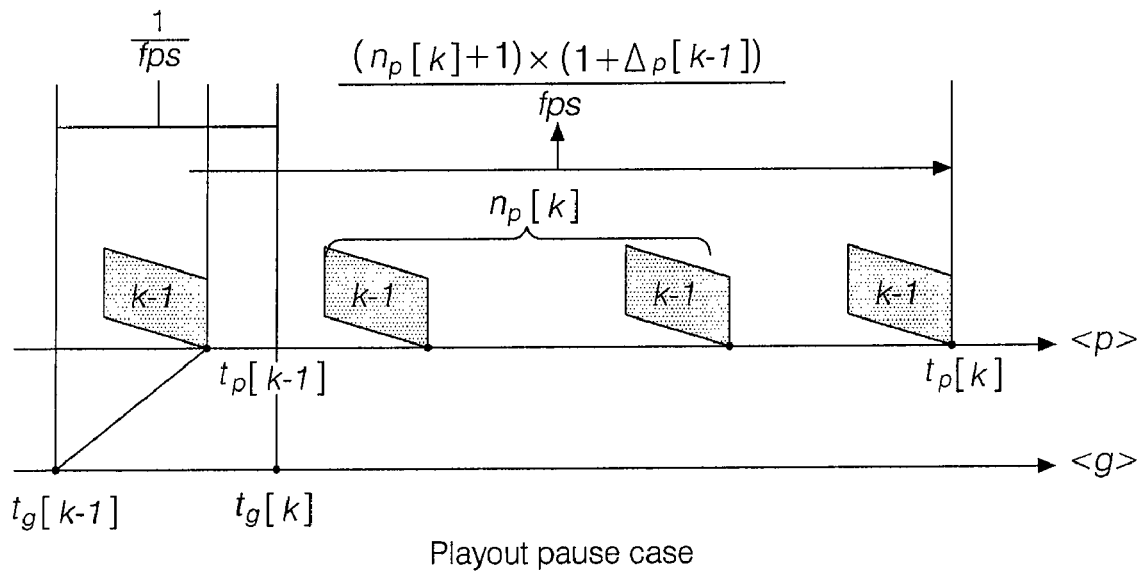
Playout pause case

[FIG. 6]
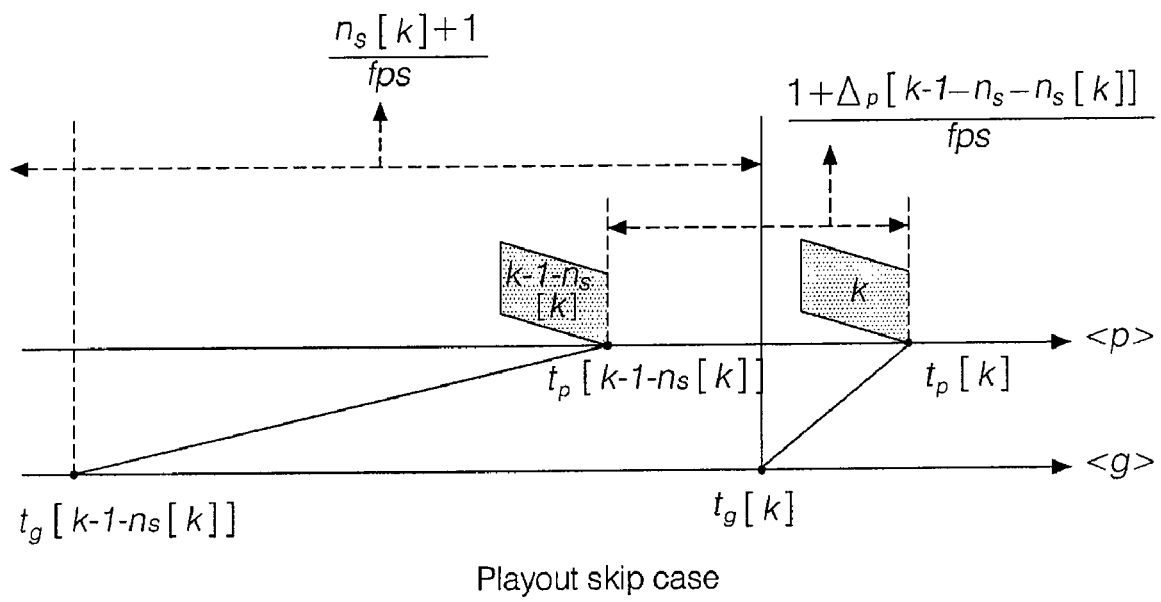
Playout skip case

[FIG. 7]
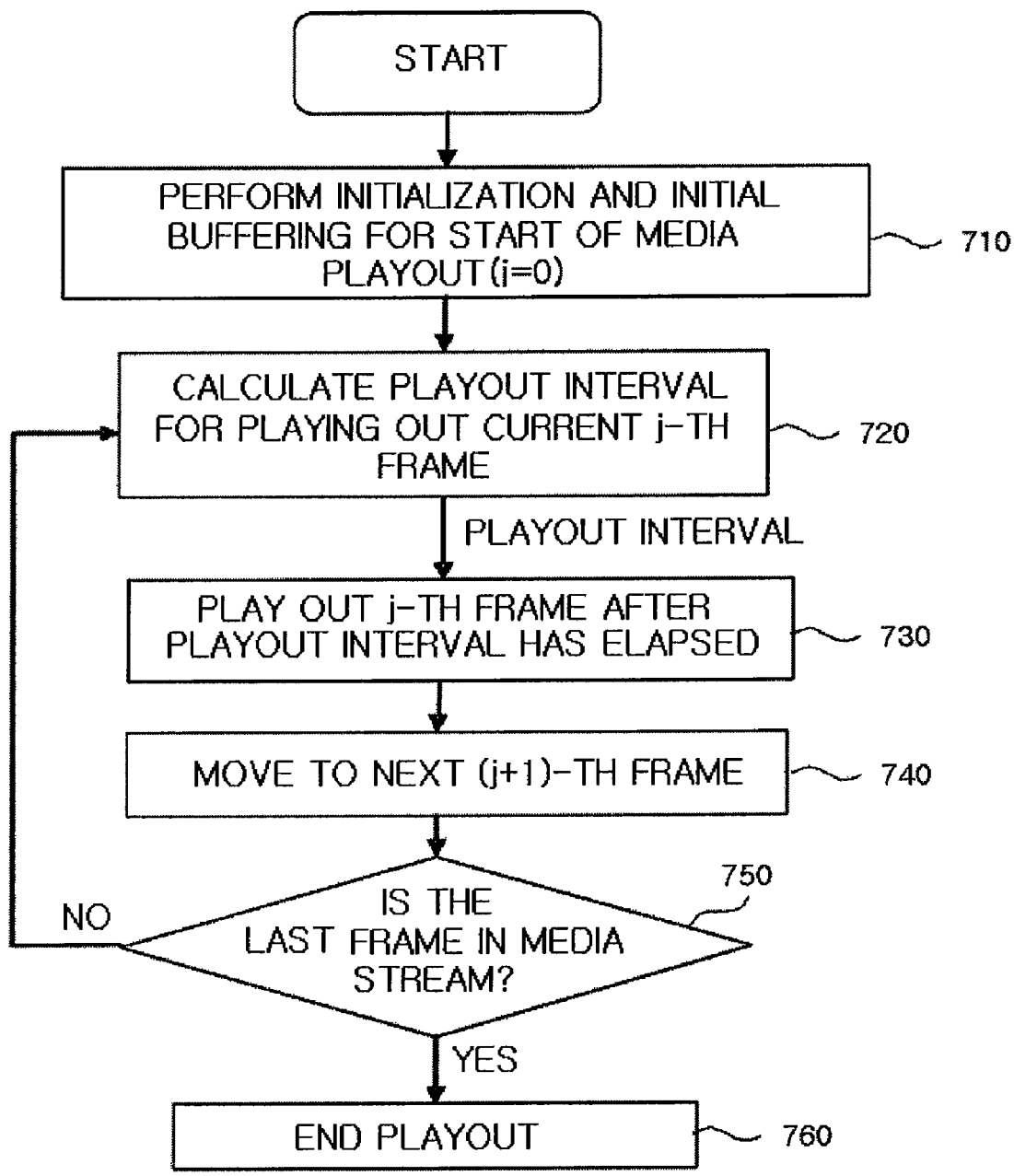

[FIG. 8]
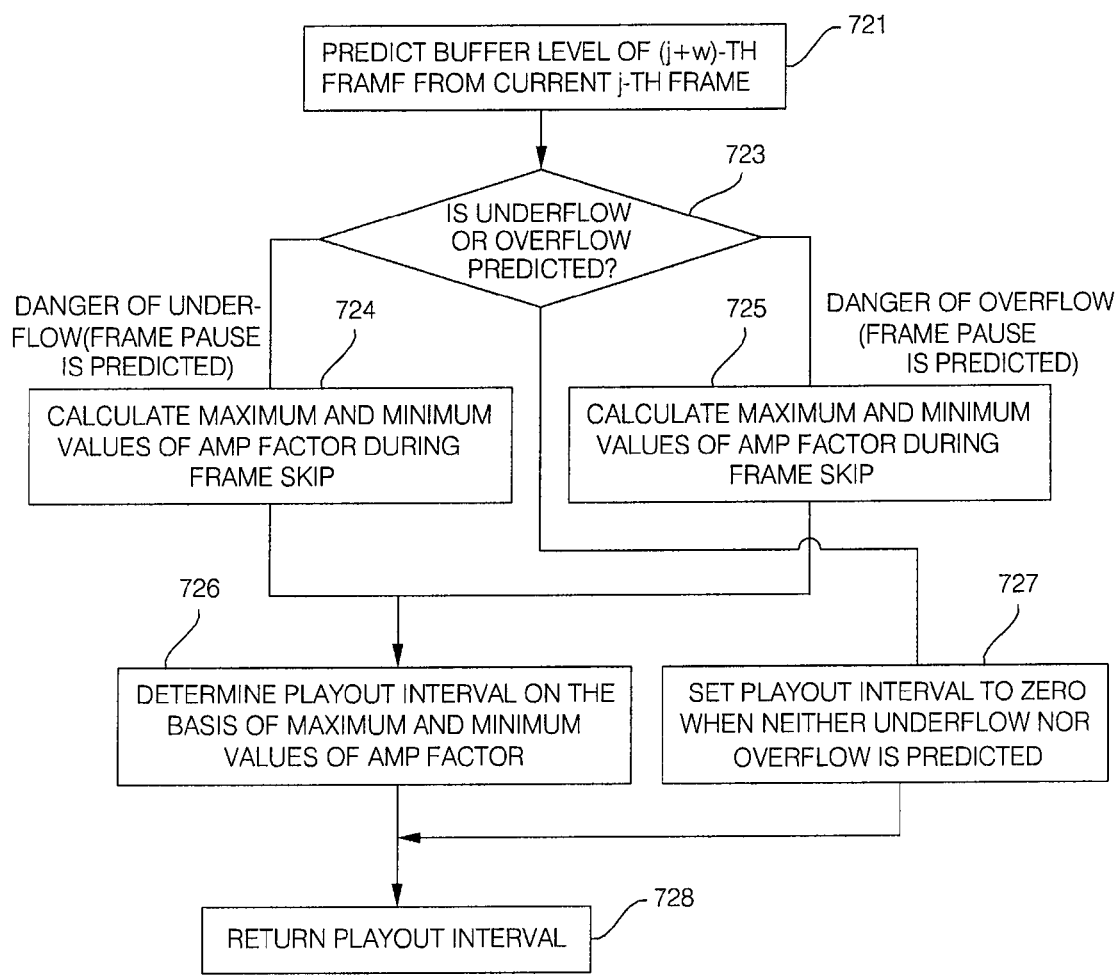

[FIG. 9]
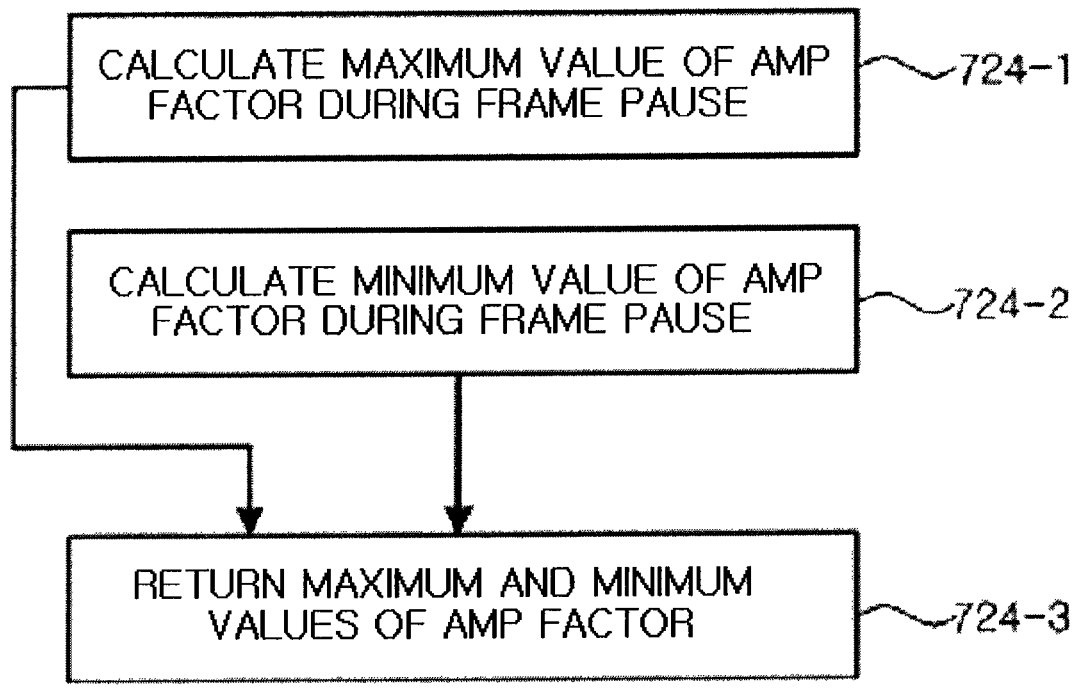
[FIG. 10]
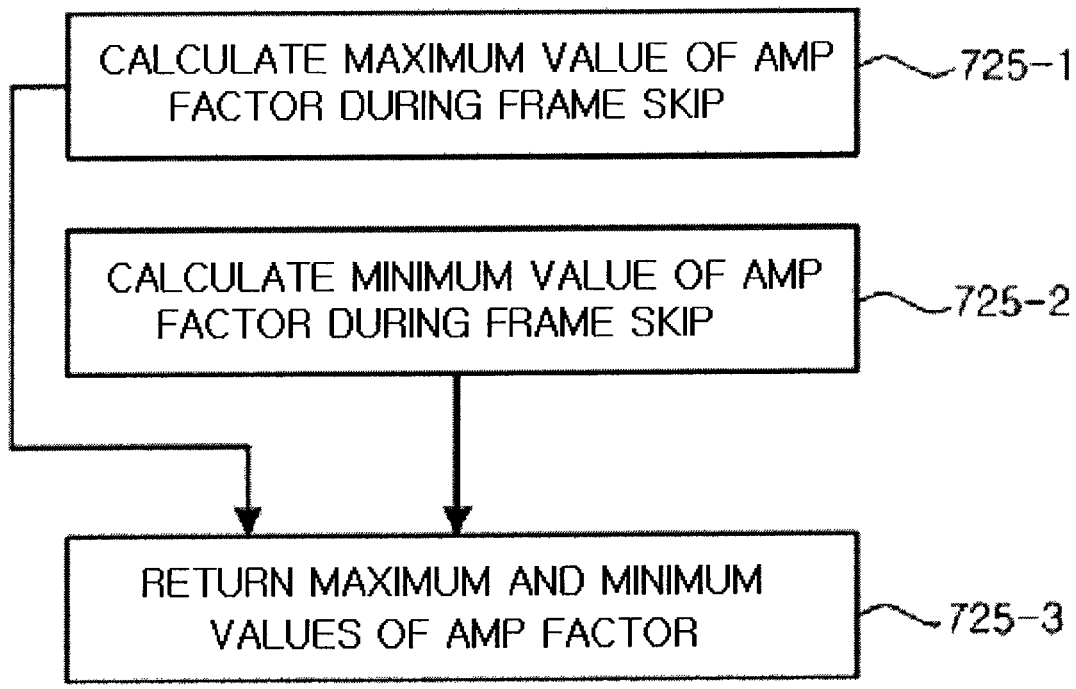

[FIG. 11]
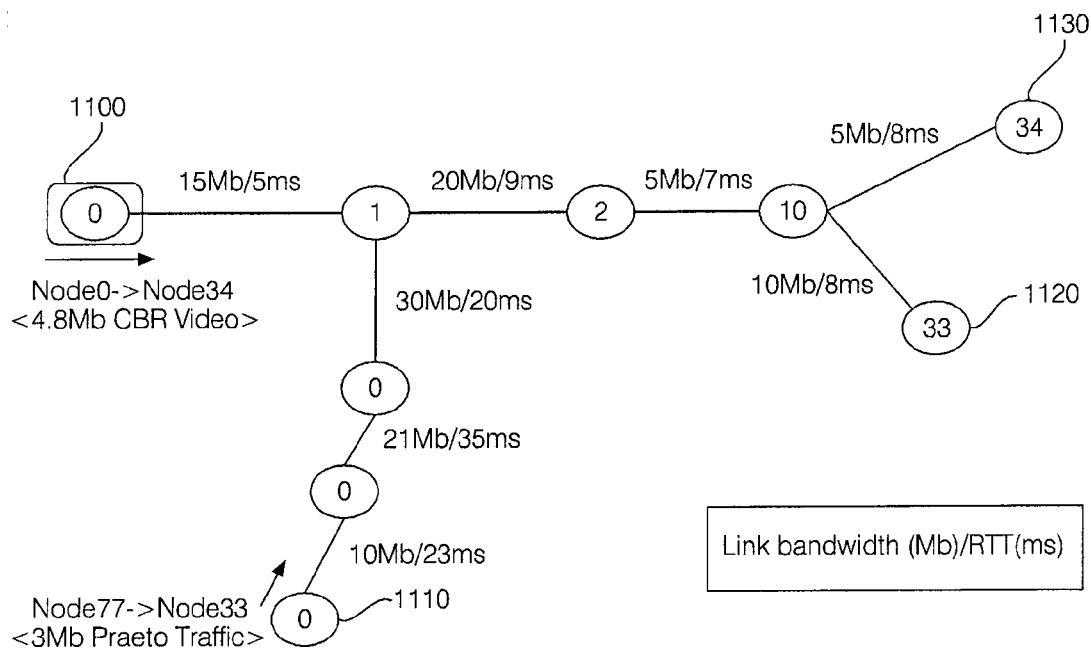

[FIG. 12]
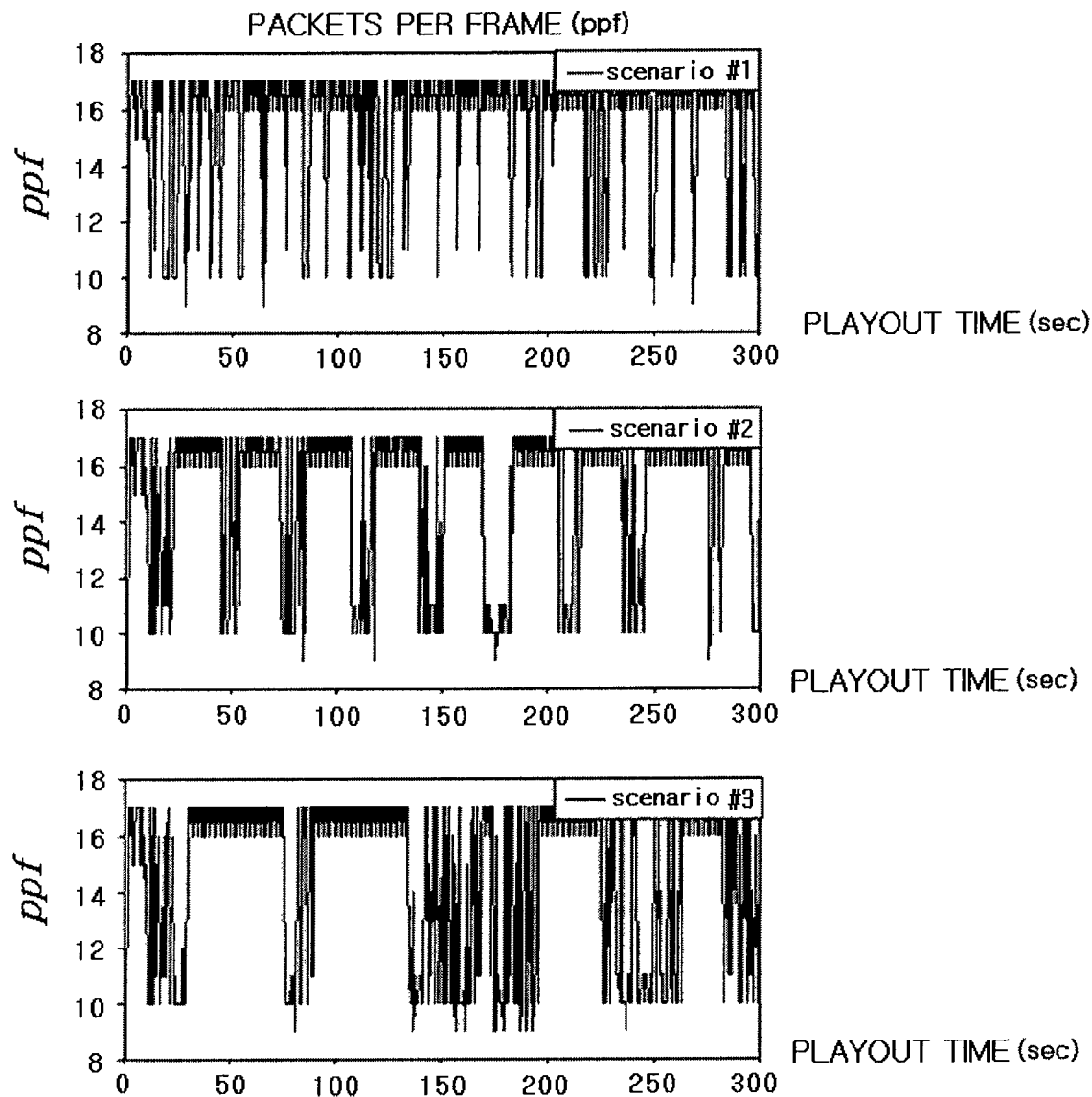

[FIG. 13]
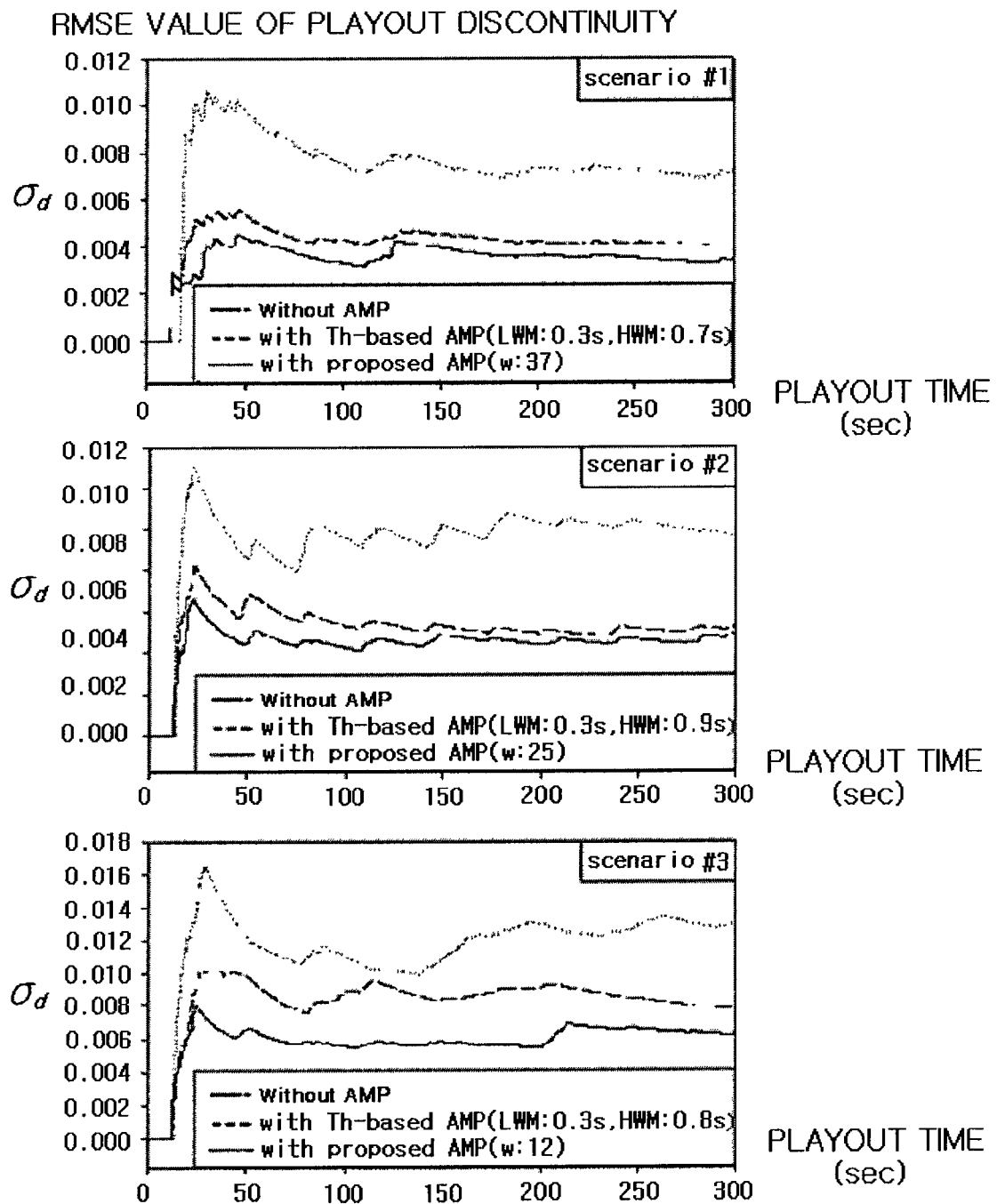

[FIG. 14]
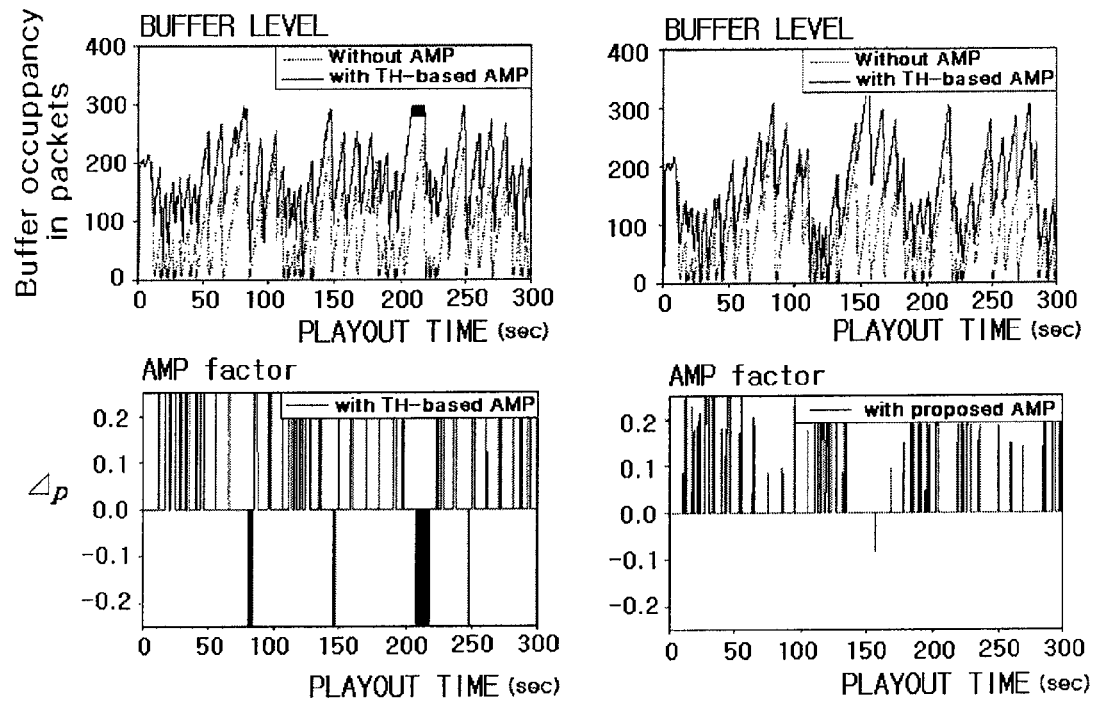
[FIG. 15]
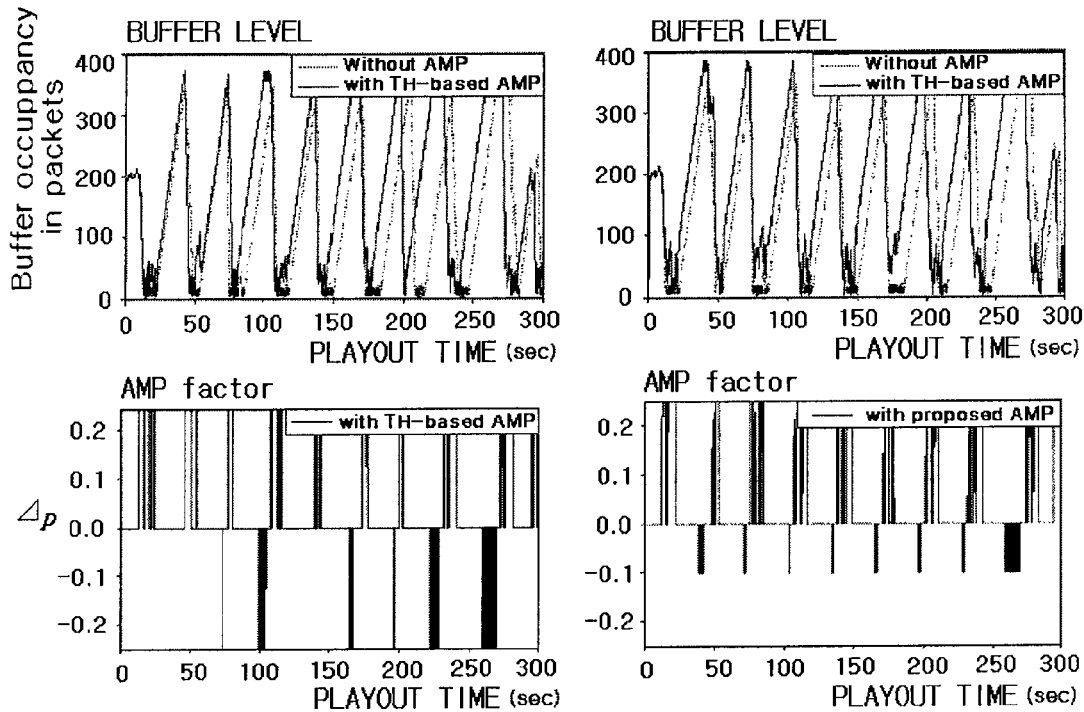

[FIG. 16]
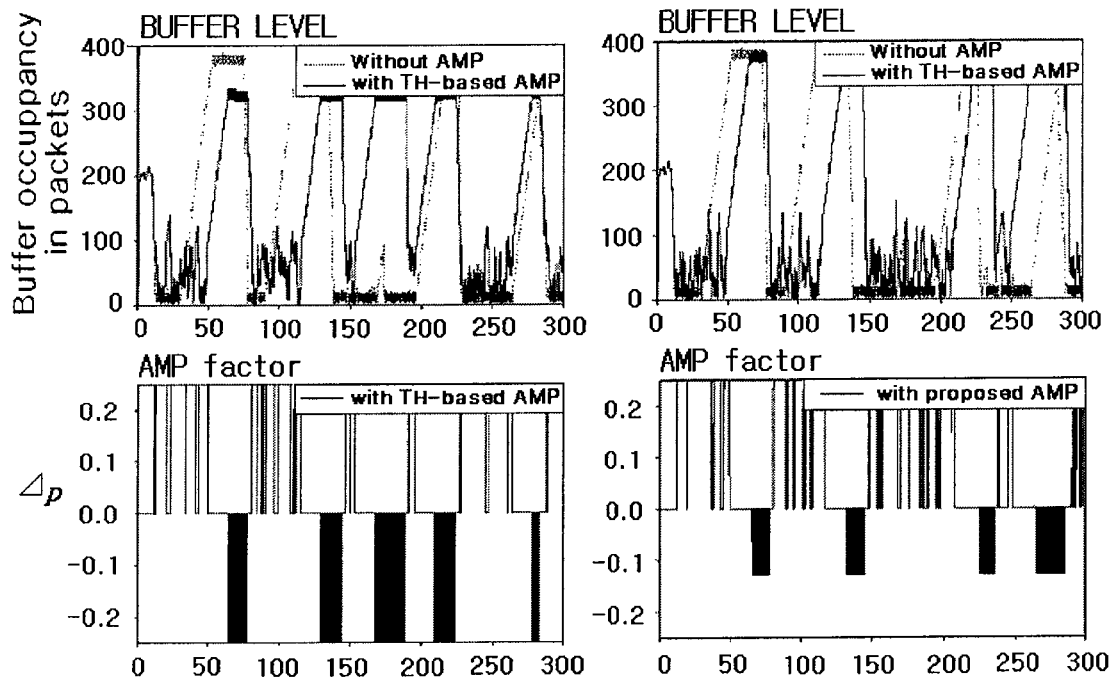
[FIG. 17]
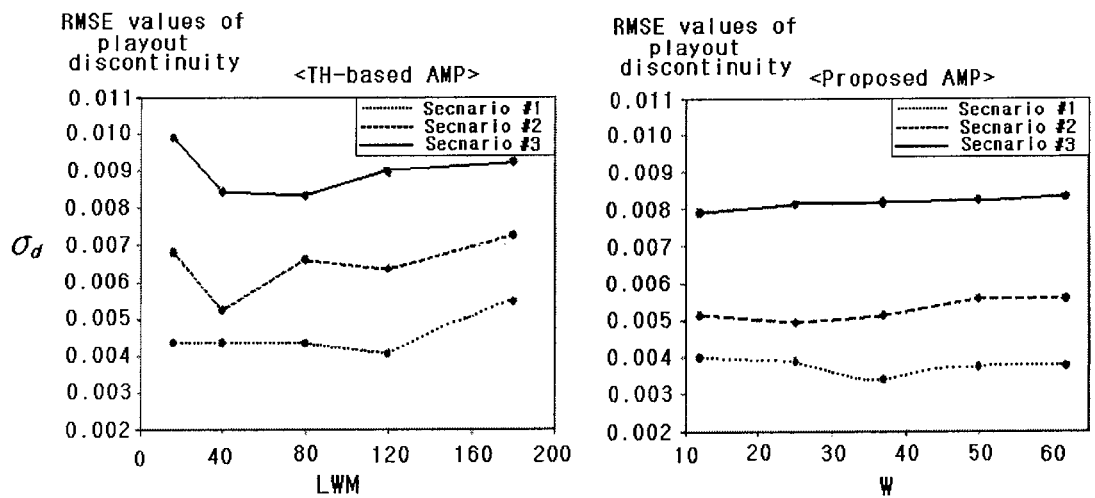

[FIG. 18]
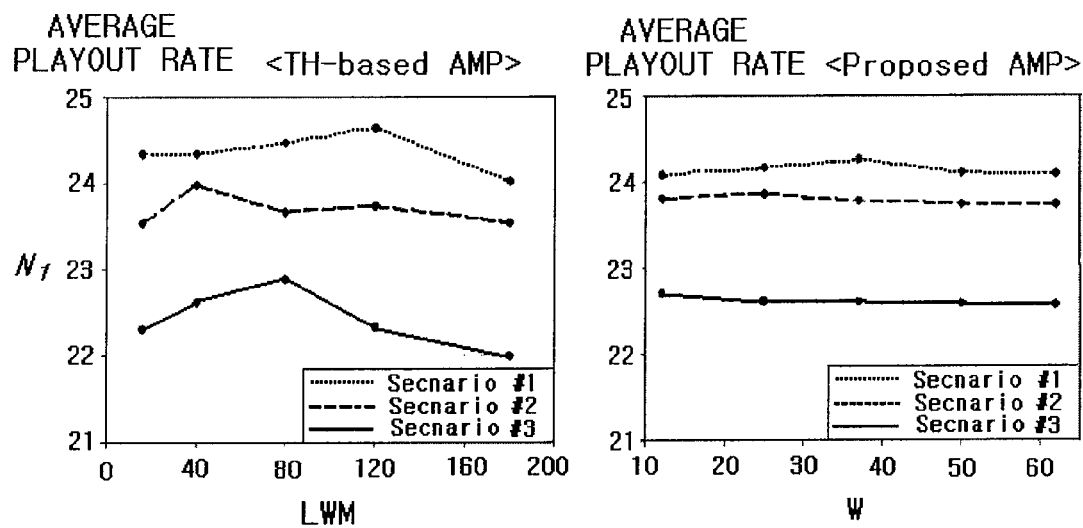
[FIG. 19]
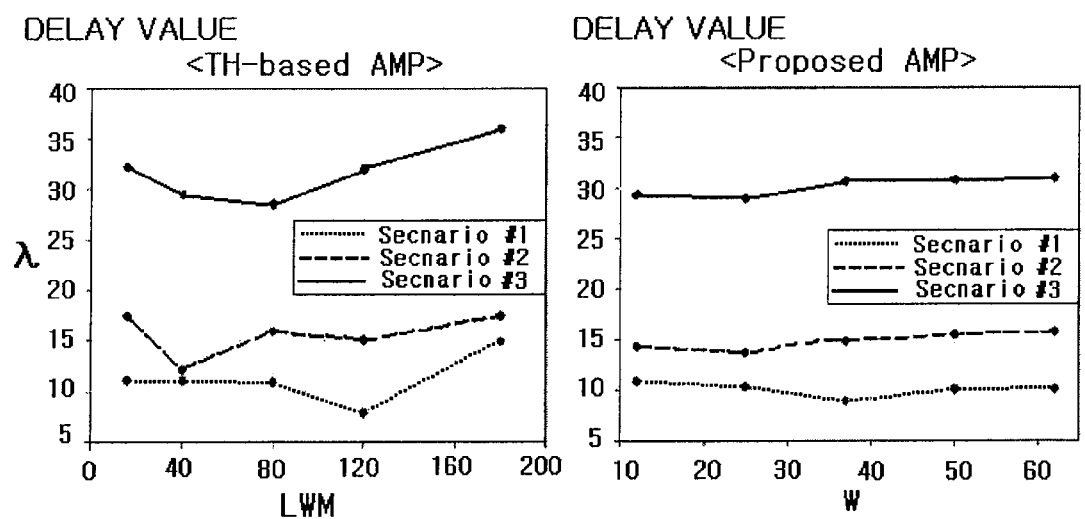

[FIG. 20]

| Scheme | SCENARIO | RMSE VALUE OF PLAYOUT DISCONTINUITY σd(10⁻³) | | | AVERAGE PLAYOUT RATE(Nf) | | | DELAY VALUE(λ) | | |
|---|---|---|---|---|---|---|---|---|---|---|
| | | MIN | AVG | STD | MIN | AVG | STD | MIN | AVG | STD |
| No AMP | #1 | 7.24 | | | 21.03 | | | 9.44 | | |
| | #2 | 9.79 | | | 19.02 | | | 16.32 | | |
| | #3 | 13.10 | | | 17.56 | | | 24.96 | | |
| TH-based AMP | #1 | 4.06 | 4.52 | 0.55 | 24.02 | 4.52 | 0.23 | 7.9 | 11.17 | 2.49 |
| | #2 | 5.23 | 6.44 | 0.75 | 5.23 | 23.54 | 0.18 | 12.2 | 15.62 | 2.17 |
| | #3 | 8.31 | 8.96 | 0.64 | 8.31 | 22.00 | 0.34 | 28.5 | 31.60 | 2.88 |
| Proposed AMP | #1 | 3.40 | 3.75 | 0.22 | 3.40 | 24.38 | 0.08 | 8.9 | 10.03 | 0.72 |
| | #2 | 4.91 | 5.26 | 0.29 | 4.91 | 23.78 | 0.05 | 13.66 | 14.78 | 0.85 |
| | #3 | 7.91 | 7.16 | 0.16 | 7.91 | 22.57 | 0.06 | 28.91 | 30.10 | 0.91 |

ADAPTIVE MEDIA PLAYOUT METHOD AND APPARATUS FOR INTRA-MEDIA SYNCHRONIZATION

BACKGROUND OF THE INVENTION

1. Field of the Invention

The present invention relates to a media playout method in a receiver side in a network media streaming system, and more particularly, to an adaptive media playout method using buffer-based adaptive intra-media synchronization in a receiver side in a network media streaming system.

2. Description of the Related Art

In a media streaming service in a best-effort IP network, it is important that the final user on a receiver side satisfy a playout quality in term of space and time. However, the playout quality may be significantly damaged due to, for example, packet loss, delay, and jitter under network congestion conditions. For example, a partial packet loss in one video frame may cause a PNSR (Peak Signal to Noise Ratio), which is a unit for measuring a spatial quality, to be lowered. A reduction in temporal playout quality, such as playout pause and skip, due to packet delay and jitter deteriorates the overall playout quality.

The deterioration of the spatial playout quality is handled by error control techniques, such as an automatic repeat request (ARQ) and forward error correction, while the deterioration of the temporal playout quality is handled by a media synchronization technique. In general, the media synchronization is divided into intra-media synchronization, inter-media synchronization, and inter-client synchronization.

The intra-media synchronization is a technique for preserving the temporal relationship between media units (MUs) in a single stream. The inter-media synchronization is a technique for preserving the temporal relationship between streams, such as lip synchronization between audio and video. The inter-client synchronization is a technique for matching the playout times of clients in the multicast media streaming applications, such as a real-time sports broadcast or a video conference.

A general streaming system includes basic functions for the intra-media synchronization. As a first basic function, a transmitter generates a time stamp and inserts it in a media stream such that a receiver side can restore the playout time of the media units. For example, an MPEG (Moving Picture Experts Group) standard provides time stamps, such as SCR (System Clock Reference), PTS (Presentation Time Stamp), and DTS (Decoding Time Stamp), and defines a synchronization model in a system layer. As a second basic function, a playout buffer for buffering packet delay and jitter is provided in the receiver side. The buffering capacity of packet delay and jitter may conflict with playout delay according to the size of the playout buffer. Therefore, the size of the playout buffer should be determined carefully in consideration of the type of streaming application.

However, such basic functions cannot ensure the intra-media synchronization under the conditions that heavy network congestion occurs. For example, buffer underflow or overflow is likely to occur in the receiver side according to the network conditions that are time variable. As a result, playout discontinuity, such as playout pause or playout skip, occurs.

An adaptive media playout (hereinafter, referred to as AMP) technique adjusts the playout times of media units to improve intra-media synchronization quality. That is, the AMP technique enables the receiver side to schedule the playout times of media units according to network conditions. The basic operation of the AMP technique is based on the fact that the viewers feel that short playout discontinuity that is controlled well has better quality than long playout discontinuity that is difficult to predict. Informal experiments prove that the viewers little perceive playout rate control up to 25% by the AMP and playout rate control up to 50% can be accepted according to characteristics of media contents.

The AMP techniques that have been proposed until now are classified into time-based models and buffer-based models. The techniques using the time-based model explicitly measure network delay and jitter using time stamps and time information received from the transmitter side and the receiver side. In contrast, the techniques using the buffer-based model implicitly measure network delay and jitter using the amount of packets stored in the playout buffer of the receiver side.

Both the time-based model and the buffer-based model adjust the playout times of the media units, on the basis of measured parameters (explicit network delay and jitter, or buffered data), in order to avoid playout discontinuity. However, there are limitations that the performances of the techniques using the time-based model depend on the presence of the synchronized time between a transmitter and a receiver. This is because the accuracy of the measured network delay and jitter may be lowered due to the time error between the transmitter and the receiver. In order to solve this problem, an approximate time measuring technique and a synchronizing technique not using time have been proposed. The buffer-based techniques have an advantage in that the synchronized time between the transmitter side and the receiver side is not required.

In the beginning, the AMP techniques were used for packet audio applications, such as VoIP (Voice over Internet Protocol). An AMP algorithm that adjusts delay in the playout of audio packets due to a variable network delay has been proposed in Ramjee, J. Kurose, D. Towsley and H. Schulzrinne, "Adaptive playout mechanisms for packetized audio applications in wide-area networks," in Proc. IEEE INFOCOM '94, vol. 2, pp. 680-688, June 1994. The proposed algorithms use the time-based model, and it is assumed that there is the synchronized time as a whole. A media synchronization algorithm introducing the concept of time has been proposed in Y. Ishibashi and S. Tasaka, "A synchronization mechanism for continuous media in multimedia communications," in Proc. IEEE INFOCOM '95, pp. 1010-1019, April 1995. In the paper, it is assumed that the delay time of a network is limited to a predetermined value. An optimum average playout delay computing method for packet audio applications in the time-based model has bee proposed in S. B. Moon, J. Kurose and D. Towsley, "Packet audio playout delay adjustment: Performance bounds and algorithms," ACM/Springer Multimedia Systems, vol. 5, no. 1, pp. 17-28, January 1998. In this paper, the performances of the packet audio applications are compared.

An AMP protocol, which is called ASP (Adaptive Synchronization Protocol), has been proposed in K. Rothermel and T. Helbig, "An adaptive stream synchronization protocol," in Proc. NOSSDAV '95, vol LNCS 1018, pp. 189-202, April 1995. In this paper, a technique for controlling a receiver-side playout buffer has been proposed for network video applications. Further, in this paper, buffer threshold values, such as a low water mark (LWM) and a high water mark (HWM), are defined. Furthermore, in this paper, the playout rate is adaptively controlled when the current buffer level is lower than LWM or higher than HWM. Another AMP technique, which is called a buffer-based slide control protocol, has been proposed in M. Kato, N. Usui and S. Tasaka, "Stored media synchronization based on buffer occupancy in PHS", in Proc. IEEE PIMRC '97, vol. 3, pp. 1049-1053, September 1997. This paper discloses a method of appropriately determining a buffer threshold value, which is an important guideline for AMP control.

A single-buffer-based AMP technique has been proposed in M. C. Yuang, P. L. Tien and S. T. Liang, "Intelligent video smoother for multimedia communications," IEEE Journal on Selected Areas in Communications, vol. 15, no. 2, pp. 136-146, February 1997. This paper discloses a method of determining a proper buffer threshold value using a neural network traffic predictor, and defines VoD (Variance of Discontinuity) as a measure for intra-media synchronization quality. However, in order to apply the technique disclosed in the paper, a complicated traffic predictor is required, which makes it difficult to implement the technique. VDoP (Variance of Distortion of Playout) is defined as a measure for intra-media synchronization quality in N. Laouaris and I. Stavrakakis, "Adaptive playout strategies for packet video receivers with finite buffer capacity", in Proc. IEEE ICC '01, vol. 3, pp 1660-1672, September 1999. VDoP is obtained by adding a factor capable of measuring the effect of frame loss due to buffer underflow to VoD. A quality-based adaptive media synchronization technique that adaptively determines a playout rate on the basis of RMSE (Root Mean Square Error) of the previous playout discontinuity has been proposed in H. Liu and M. E. Zarki, "A synchronization control scheme for real-time streaming multimedia applications", in Proc. Packet Video Workshop 2003, April 2003.

The AMP techniques using the known playout discontinuity model use, as input parameters, the current buffer level, predetermined buffer threshold values, and the RMSE value of the previous playout discontinuity, or a complicated traffic analyzer to determine the playout rate, thereby performing intra-media synchronization. Therefore, there are limitations in improving intra-media synchronization quality.

SUMMARY OF THE INVENTION

Accordingly, a first object of the invention is to provide a buffer-based adaptive media playout method capable of improving intra-media synchronization quality.

A second object of the invention is to provide an adaptive media playout apparatus capable of improving intra-media synchronization quality.

In order to achieve the first object, according to an aspect of the invention, there is provided a buffer-based adaptive media playout method in a receiver side of a network media streaming system. The method includes: calculating a playout interval for playing out a current j-th frame (where j is a natural number) of a received media stream; and playing out the current j-th frame after the calculated playout interval has elapsed from the reception of the current j-th frame. The calculating of the playout interval for playing out the current j-th frame of the received media stream includes: calculating a buffer level of a (j+w)-th frame (where w is a natural number); estimating a playout pause or a playout skip on the basis of the calculated buffer level; and calculating the playout interval for playing out the current j-th frame for the predicted one of the playout pause and the playout skip.

In the calculating of the buffer level of the (j+w)-th frame, the buffer level may be calculated by computing a predetermined predicted reception rate of the j-th frame.

In the calculating of the buffer level of the (j+w)-th frame, a weight may be applied to an average reception rate of the media stream and a reception rate between the playout time of a (j−1)-th frame and the playout time of a (j−2)-th frame to calculate the predicted reception rate.

In the estimating of the playout pause or the playout skip on the basis of the calculated buffer level, when underflow occurs in the calculated buffer level, the playout pause may be predicted, and when overflow occurs in the calculated buffer level, the playout skip may be predicted.

The calculating of the playout interval for playing out the current j-th frame for the predicted one of the playout pause and the playout skip may include calculating the playout interval for playing out the current j-th frame for the predicted one of the playout pause and the playout skip on the basis of a playout rate control parameter.

In the calculating of the playout interval for playing out the current j-th frame for the predicted one of the playout pause and the playout skip on the basis of the playout rate control parameter, the playout interval for playing out the current j-th frame may be calculated on the basis of maximum and minimum values of the playout rate control parameter during the predicted playout pause or maximum and minimum values of the playout rate control parameter during the predicted playout skip.

The playout rate control parameter may be determined by an intermediate value between the maximum and minimum values calculated according to the buffer level.

In order to achieve the second object, according to another aspect of the invention, an adaptive media playout apparatus includes: a playout buffer that stores media packets received from a network; a video decoder that decodes the media packets stored in the playout buffer; and an adaptive media playout control unit that predicts a playout pause and a playout skip on the basis of the buffer level of a (j+w)-th frame (where j and w are natural numbers) of the decoded media packets, and calculates a playout interval for playing out a current j-th frame for the predicted one of the playout pause and the playout skip.

BRIEF DESCRIPTION OF THE DRAWINGS

FIG. 1 is a block diagram illustrating the structure of a network system using a general adaptive media playout (AMP) method;

FIG. 2 is a block diagram illustrating the structure of an adaptive media playout apparatus performing adaptive media playout (AMP) according to an embodiment of the invention;

FIG. 3 is a conceptual diagram illustrating an adaptive media playout (AMP) process performed in the adaptive media playout apparatus according to the embodiment of the invention;

FIG. 4 is a conceptual diagram illustrating a basic playout discontinuity model between a continuous series of media units during playout;

FIG. 5 is a conceptual diagram illustrating a playout discontinuity model during playout pause;

FIG. 6 is a conceptual diagram illustrating a playout discontinuity model during playout skip;

FIG. 7 is a flowchart illustrating a buffer-based adaptive media playout method in an adaptive media playout apparatus of a network media streaming system according to another embodiment of the invention;

FIG. 8 is a flowchart illustrating a process of calculating a playout interval of the current frame in FIG. 7;

FIG. 9 is a flowchart illustrating a process of calculating maximum and minimum values of a playout rate during playout pause in FIG. 8;

FIG. 10 is a flowchart illustrating a process of calculating the maximum and minimum values of the playout rate during playout skip in FIG. 8;

FIG. 11 is a conceptual diagram illustrating simulation topology for evaluating the performance of the buffer-based adaptive media playout method according to the embodiment of the invention;

FIG. 12 is a graph illustrating packets per frame measured in a receiver when the buffer-based adaptive media playout method according to the embodiment of the invention is simulated according to three scenarios;

FIG. 13 is a graph illustrating the RMSE values of playout discontinuity measured in the receiver when the buffer-based adaptive media playout method according to the embodiment of the invention is simulated according to three scenarios;

FIG. 14 is a graph illustrating buffer levels and AMP factor values measured in the receiver when the buffer-based adaptive media playout method according to the embodiment of the invention is simulated according to scenario 1;

FIG. 15 is a graph illustrating buffer levels and AMP factor values measured in the receiver when the buffer-based adaptive media playout method according to the embodiment of the invention is simulated according to scenario 2;

FIG. 16 is a graph illustrating buffer levels and AMP factor values measured in the receiver when the buffer-based adaptive media playout method according to the embodiment of the invention is simulated according to scenario 3;

FIG. 17 is a graph illustrating the RMSE values of playout discontinuity measured in the receiver when a buffer-based adaptive media playout method according to the related art and the buffer-based adaptive media playout method according to the embodiment of the invention are simulated according to three scenarios while changing buffer threshold values and a window size w;

FIG. 18 is a graph illustrating average playout rates measured in the receiver when the buffer-based adaptive media playout method according to the related art and the buffer-based adaptive media playout method according to the embodiment of the invention are simulated according to three scenarios while changing the buffer threshold values and the window size w;

FIG. 19 is a graph illustrating delay values measured in the receiver when the buffer-based adaptive media playout method according to the related art and the buffer-based adaptive media playout method according to the embodiment of the invention are simulated according to three scenarios while changing the buffer threshold values and the window size w; and FIG. 20 is a graph illustrating the performances of the buffer-based adaptive media playout method according to the related art and the buffer-based adaptive media playout method according to the embodiment of the invention when the methods are simulated according to three scenarios.

DESCRIPTION OF THE PREFERRED EMBODIMENTS

Since the invention can be changed in various ways and include various embodiments, specific embodiments are illustrated in the drawings, and will be described in detail.

The scope of the present invention is defined by the appended claims rather than by the description preceding them, and all changes and modifications that fall within meets and bounds of the claims, or equivalences of such meets and bounds are therefore intended to be embraced by the claims.

It will be understood that, although the terms first, second, third, etc., may be used herein to describe various elements and components, these elements and components should not be limited by these terms. These terms are only used to distinguish one element component from another element. For example, a first element or component could be termed a second element or component without departing from the teachings of the example embodiments. As used herein, the term "and/or" includes any and all combinations of one or more of the associated listed items.

Hereinafter, exemplary embodiments of the invention will be described in detail with reference to the accompanying drawings. In the drawings, the same components are denoted by the same reference numerals, and a repetitive description thereof will be omitted.

In the following description, the term 'media' includes video or audio.

1.1 Basic Adaptive Media Playout (AMP) Frame Work

FIG. 1 is a block diagram illustrating the structure of a network system using a general adaptive media playout (AMP) method. FIG. 2 is a block diagram illustrating the structure of a receiver-side adaptive media playout apparatus performing adaptive media playout (AMP) according to an embodiment of the invention. FIG. 3 is a conceptual diagram illustrating an adaptive media playout (AMP) process performed in an adaptive media playout apparatus.

Referring to FIG. 1, the network system using an adaptive media playout (AMP) method includes a transmitter 10, an IP network 20, and an adaptive media playout apparatus 100. The adaptive media playout apparatus 100 indicates a receiver. Referring to FIG. 2, the adaptive media play apparatus 100 includes a CPU 120, a main memory, an AMP control unit 130, a network device 140, a video decoder 150, and a video output unit 160. The CPU 120, the main memory, and the AMP control unit 130 are connected to the network device 140, the video decoder 150, and the video output unit 160 through a bus 170. The main memory may include a playout buffer 115. In FIG. 2, the playout buffer 115 is provided inside the main memory, but it may be separately provided outside the main memory. In the following description, it is assumed that the invention is applied to video streaming. However, the invention may also be applied to audio streaming.

The CPU 120 and the main memory execute general application programs.

The playout buffer 115 receives video packets transmitted from the network device 140 through the bus 170, and stores the received packets.

The AMP control unit 130 is connected such that it is controlled by the CPU 120 and the main memory, controls data transmission among the playout buffer 115, the video decoder 150, and the video output unit 160 through the bus 170, and controls of the output time of the video output unit 160.

Referring to FIG. 3, the playout buffer 115 receives the video packets transmitted from the network device 140 through the bus 170, and stores the received packets. The video decoder 150 decodes the video packets stored in the playout buffer 115.

The AMP control unit 130 calculates a predicted reception rate to predict a buffer level in the near, and determines a playout discontinuity model, that is, any one of playout pause and skip, on the basis of the predicted buffer level. The AMP control unit 130 calculates the maximum and minimum values of an AMP factor for the determined playout discontinuity model in order to determine a playout interval according to the predicted buffer level. In addition, the AMP control unit 130 controls the playout time of the current media unit transmitted from the video decoder 150 by calculating the playout time using the maximum and minimum values of the AMP factor.

As shown in FIG. 1, the playout time line of general media units includes a generation time <g>, an arrival time <a>, and a playout time <p>. The generation time $t_g[k]$ of a k-th media unit can be calculated from the generation time $t_g[k-1]$ of a (k−1)-th media unit by Equation 1 given below:

$$t_g[k] = t_g[k-1] + \frac{1}{fps} \quad \text{[Equation 1]}$$

(where fps (frame per second) indicates the frame rate of the original video stream).

As shown in FIG. 1, the transmitter 10 transmits media units having time stamps to the playout buffer 115 of the adaptive media playout apparatus 100 through the IP network 20. The AMP control unit 130 of the adaptive media playout apparatus 100 schedules the playout times of the media units.

Similar to the generation time, the playout time $t_p[k]$ of the k-th media unit can be calculated from the playout time $t_p[k-1]$ of the (k−1)-th media unit by Equation 2 given below:

$$t_p[k] = t_p[k-1] + \frac{1 + \Delta_p[k-1]}{fps} \quad \text{[Equation 2]}$$

(where $\Delta_p[k-1]$ indicates an AMP factor of the (k−1)-th media unit, and the AMP factor is used as a parameter for controlling a playout rate).

$\Delta_p[k-1]$ determines the playout interval between the k-th and (k−1)-th media units. For example, when $\Delta_p[k-1]$ has a positive value, the playout rate decreases, and the playout time is delayed. In FIG. 1, b[k] indicates the buffer level of $t_p[k]$ in the unit of bits.

1.2 Playout Discontinuity Model

FIG. 5 is a conceptual diagram illustrating a playout discontinuity model during playout pause, and FIG. 6 is a conceptual diagram illustrating a playout discontinuity model during playout skip. FIGS. 5 and 6 show basic playout discontinuity models between continuous media units in the playout time line.

From Equation 1 and Equation 2, the playout discontinuity between the k-th and (k−1)-th media units is calculated by Equation 3 given below:

$$d[k] = |(t_g[k] - t_g[k-1]) - (t_p[k] - t_p[k-1])| = \frac{\Delta_p[k-1]}{fps}. \quad \text{[Equation 3]}$$

Therefore, when the k-th and (k−1)-th media units are played out at the scheduled time, d[k] is zero.

In addition, delay at $t_p[k]$ is defined by Equation 4 given below:

$$\lambda[k] = t_p[k] - t_g[k]. \quad \text{[Equation 4]}$$

In order to define a single playout discontinuity model, the playout pause and skip need to be considered. First, the pause of $t_p[k]$ as in FIG. 4 will be considered. In this case, $n_p[k]$ indicates the number of frame in a playout pause between $t_p[k]$ and $t_p[k-1]$.

In the case of the play pause, the playout discontinuity model can be defined by Equation 5 given below:

$$d[k] = |(t_g[k] - t_g[k-1]) - (t_p[k] - t_p[k-1])| = \quad \text{[Equation 5]}$$

$$\left| \frac{1}{fps} - \frac{(n_p[k] + 1) \times (1 + \Delta_p[k-1])}{fps} \right| =$$

$$\frac{n_p[k] + (n_p[k] + 1) \times \Delta_p[k-1]}{fps}.$$

Similarly, in the case of the playout skip, the playout discontinuity model can be defined by Equation 6 given below:

$$d[k] = |(t_g[k] - t_g[k-1]) - (t_p[k-1] - t_p[k-1-n_s[k]]) - \quad \text{[Equation 6]}$$

$$(t_p[k] - t_p[k-1-n_s[k]])| =$$

$$\left| \frac{1}{fps} - \frac{n_s[k]}{fps} - \frac{1 + \Delta_p[k-1-n_s[k]]}{fps} \right| =$$

$$\frac{n_s[k] + \Delta_p[k-1-n_s[k]]}{fps}$$

(where $n_s[k]$ indicates the number of media units skipped between $t_p[k]$ and the media unit that is played out lately (see FIG. 5)).

Finally, from Equation 5 and Equation 6, a single playout discontinuity model can be defined by Equation 7 given below:

$$d[k] = \frac{n_p[k] + n_s[k] + (n_p[k] + 1) \times \Delta_p[k-1-n_s[k]]}{fps}. \quad \text{[Equation 7]}$$

1.3 Intra-Media Synchronization Quality

In order to measure the distortion of time during playout, a larger weight is given to long playout discontinuity than to short playout discontinuity in consideration of playout quality characteristics that viewers feel. That is, the intra-media synchronization quality decreases in geometric progression as the length of the playout discontinuity increases linearly. A root mean square error (RMSE) of the playout discontinuity can be used to measure temporal distortion.

The intra-media synchronization quality from j-th to k-th media units can be calculated by Equation 8 give below:

$$\sigma_d[j, k] = \sqrt{\frac{\sum_{i=j}^{k} d[i]^2}{k - j + 1}} \quad \text{[Equation 8]}$$

(where $\sigma_d[j:k]$ indicates the RMSE of the playout discontinuity from the j-th to k-th media units).

Equation 7 shows that it is important to minimize long playout discontinuity, such as playout pause and skip, in order to improve the intra-media synchronization quality. The AMP technique can be used to control the playout rate, thereby reduce the playout pause and skip. The control range of the playout rate by the AMP technique can depend on perception characteristics of people. Therefore, the control range of the playout rate by the AMP technique can be defined by Equation 9 given below:

$$-\Delta_{th} \leq \Delta_p[i-1] \leq \Delta_{th}, \quad i \subseteq j \sim k, \qquad \text{[Equation 9]}$$

(where $\Delta_{th}$ indicates a maximum allowable AMP control parameter (threshold of AMP parameter).

For example, $\Delta_{th}$ may be 0.25. In this case, the playout rate can be controlled in a range of −25% to 25%.

Meanwhile, the deterioration of the intra-media synchronization quality is affected by the playout discontinuity due to the AMP technique as well as the playout discontinuity due to the playout pause and skip. Therefore, an effective AMP control technique capable of minimizing the RMSE of the playout discontinuity is needed. Next, an AMP media playout method based on the playout discontinuity model according to an embodiment of the invention will be described.

2. AMP Media Playout Method Based on Playout Discontinuity Model

In order to minimize the temporal distortion, the AMP technique needs to be designed to avoid the playout pause and skip. In this regard, maximum and minimum AMP factor values are calculated for preventing the playout pause and skip. First, a single media unit (MU) pause is considered. In the case of the single media unit pause, the effective range of an AMP factor value capable of minimizing the temporal distortion is calculated. Thereafter, this expands to the pause of a plurality of media units. In the case of the playout skip, similar to the playout pause, the pause of a single media unit (MU) and the pause of multiple media units can be considered.

2.1 Playout Pause
2.1.1 Single Media Unit Pause

First, the playout discontinuity model is used to analyze a single media unit pause. It is assumed that, when the AMP technique is not applied, $n_p[k]$ is 1 at $t_p[k]$. Then, from Equation 7 and Equation 8, the RMSE of the playout discontinuity can be calculated by Equation 10 given below:

$$\sigma_d[j \cdot k] = \frac{1}{fps} \times \sqrt{\frac{1}{w}}, \quad w = k - j + 1 \qquad \text{[Equation 10]}$$

(where $w$ indicates a window size).

From Equation 9 and Equation 10, the range of the window size w can be defined by Equation 11 given below:

$$w \geq \frac{1}{\Delta_{th}^2}. \qquad \text{[Equation 11]}$$

Meanwhile, it is assumed that, when the AMP technique is applied, $n_p[k]$ is zero 0. In this case, the RMSE of the playout discontinuity when the AMP technique is applied can be calculated by Equation 12 given below:

$$\sigma_d[j \cdot k] = \frac{1}{fps} \times \sqrt{\frac{\sum_{i=j}^{k}\Delta_p[i-1]^2}{w}} \leq \frac{\Delta_{th}}{fps}, w = k - j + 1 \qquad \text{[Equation 12]}$$

(where $\Delta_{th}/fps$ indicates the minimum value of the RMSE of the playout discontinuity when the AMP technique is applied).

Therefore, from Equation 10 and Equation 12, it is regarded that the AMP framework is efficient when the maximum value conditions of the AMP factor value can be satisfied as represented by Equation 13 given below:

$$\sum_{i=j}^{k}\Delta_p[i-1]^2 < 1 \qquad \text{[Equation 13]}$$

$$\rightarrow \Delta_p[i-1] < \sqrt{\frac{1}{w}}, \quad w = k - j + 1, i \in j \sim k$$

Meanwhile, the k-th media unit pauses when a buffer level b[k] underflows as represented by Equation 14 given below:

$$b[k] < \frac{S}{fps} \qquad \text{[Equation 14]}$$

(where b[k] indicates the buffer level at $t_p[k]$).

The buffer level b[k] can be calculated by Equation 15 given below:

$$b[k] = b[j-1] + \sum_{i=j}^{k}r[i] - \left(w - \sum_{i=j}^{k}\Delta_p[i-1]\right) \times \frac{S}{fps} \qquad \text{[Equation 15]}$$

(where r[i] indicates a reception rate between $t_p[i]$ and $t_p[i-1]$, and S indicates the bit rate of a constant bit rate (CBR) video).

Therefore, from Equation 14 and Equation 15, the minimum value of the AMP factor value for avoiding the playout pause at $t_p[k]$ can be determined by Equation 16 given below:

$$\Delta_p[i-1] \geq \frac{1 - b[k] \times \frac{fps}{S}}{w}, w = k - j + 1, i \in j \sim k. \qquad \text{[Equation 16]}$$

2.1.2 Pause of Multiple Media Units

The analysis of the media unit pause can expands to the analysis of the pause of multiple media units. Assuming that a continuous series of (m+1) media units pauses after $t_p[k]$, Equation 16 can expand to AMP conditions for avoiding the pause of multiple media units as represented by Equation 17 given below:

$$\frac{fps}{S} \times \sum_{i=j+m}^{k+m}\Delta_p[i-1] \geq \qquad \text{[Equation 17]}$$

$$(m+1) - \left(b[k] + b[k+1] + \ldots + b[k+m]\right) \times \frac{fps}{S} -$$

$$\Delta_p[j-1] + \Delta_p[j] + \ldots + \Delta_p[j+m-2]\Big).$$

Therefore, when multiple media units pause, the minimum value of the AMP factor value can be defined by Equation 18 given below:

$$\Delta_p[i] \geq \frac{\frac{fps}{S} \times \sum_{i=k}^{k+m}\left(\frac{S}{fps} - b[i]\right) - \sum_{i=j}^{j+m-1} \Delta_p[i-1]}{w},$$ [Equation 18]

$$w = m + 1.$$

Similar to Equation 12, the minimum value of the AMP factor value can be determined by Equation 19 given below:

$$\Delta_p[i] < \sqrt{\frac{\sum_{i=k}^{k+m} n_p[i]^2}{w}}, \quad w = m+1$$ [Equation 19]

2.2 Playout Skip
2.2.1 Skip of Multiple Media Units

The overflow and playout skip of the playout buffer occur when the buffer level of the playout buffer 115 is higher than $b_s - S/fps$.

Analysis for the playout skip is similar to that for the playout pause. Therefore, a detailed description of the analyzing process will be omitted.

First, assuming that a continuous series of (m+1) media units skips at $t_p[k]$, the maximum value of the AMP factor value is determined by Equation 20 given below:

$$\Delta_p[i] \leq \frac{\frac{fps}{S} \times \sum_{i=k}^{k+m}\left(b_s - \frac{S}{fps} - b[i]\right) - \sum_{i=j}^{j+m-1} \Delta_p[i-1]}{w},$$ [Equation 20]

$$w = m + 1$$

(where $b_s$ indicates the size of the playout buffer 115 of the adaptive media playout apparatus 100).

The minimum value of the AMP factor value is determined by Equation 21 given below:

$$\Delta_p[i] > -\sqrt{\frac{\sum_{i=k}^{k+m} n_p[i]^2}{w}}, \quad w = m+1.$$ [Equation 21]

2.3 Playout Rate Determining Algorithm

In order to avoid the pause and skip of media units, the maximum and minimum values of the AMP factor value are defined. The adaptive media playout method according to the embodiment of the invention dynamically determines the AMP factor value according to given conditions, from the definition of the maximum and minimum values of the AMP factor value.

The adaptive media playout method according to the embodiment of the invention uses one weight Equation (see Equation 24) to predict the buffer levels from the current j-th frame to a (j+w)-th frame. In addition, when the playout pause and skip are predicted from the predicted buffer level, an effective AMP factor value is dynamically adjusted on the basis of the playout discontinuity model. This approach enables the AMP control technique according to the embodiment of the invention to reduce the temporal distortion, such as the RMSE of the playout discontinuity due to delay or jitter, as compare to the existing buffer-threshold-based technique.

Next, an adaptive media playout method according to an embodiment of the invention will be described.

2.3.1 Description of AMP Control Algorithm

FIG. 7 is a flowchart illustrating a buffer-based adaptive media playout method in an adaptive media playout apparatus of a network media streaming system according to an embodiment of the invention, and FIG. 8 is a flowchart illustrating a process of calculating the playout interval of the current frame in FIG. 7. FIG. 9 is a flowchart illustrating a process of calculating the maximum and minimum values of the playout rate during playout pause in FIG. 8, and FIG. 10 is a flowchart illustrating a process of calculating the maximum and minimum values of the playout rate during playout skip in FIG. 8.

Referring to FIG. 7, in the buffer-based adaptive media playout method according to the embodiment of the invention, in order to playout the media units received through the network 20, the adaptive media playout apparatus 100 performs an initializing process and an initial buffer process (Step 710). The video packet that is initially received is stored in the playout buffer 115 through the network device 140 and the bus 170. In the initial frame, j is set to zero, and w is set to a predetermined initial value. The value of w is larger than $1/\Delta_{th}^2$ as represented by Equation 11. The first media unit is played out when the buffer level of the playout buffer 115 is higher than a target buffer level.

The AMP control unit 130 calculates a playout interval for playing out the received current j-th frame (Step 720). As represented by Equation 2, the playout interval can be calculated by $(1+\Delta_p[j])/fps$ using the AMP factor value $\Delta_p[j]$. That is, the current j-th frame is played out after the playout time $(1+\Delta_p[j])/fps$. A process of calculating a playout interval for playing out the current j-th frame will be described below with reference to FIGS. 8 to 10.

The AMP control unit 130 plays out the current j-th frame after the calculated playout interval has elapsed from the reception of the current j-th frame (Step 730).

The AMP control unit 130 plays out the current j-th frame, and then performs Steps 720 and 730 for the next frame, that is, a (j+1)-th frame. The AMP control unit 130 repeatedly performs Steps 720 to 740 until the frame reaches the last frame of the received media stream (Step 750), and then ends the media stream playout process (Step 760).

Next, the process of calculating the playout interval for playing out the current j-th frame will be described with reference to FIGS. 8 to 10.

First, the AMP control unit 130 predicts the buffer level of a (j+w)-th frame from the current j-th frame (Step 721). Specifically, first, the AMP control unit 130 calculates the reception rate from $t_p[k]$ to $t_p[j+w]$ by a weight expression, that is, the following Equation 22:

$$r_{est}[i] = \alpha \times R + (1-\alpha) \times r[i-1]$$ [Equation 22]

(where $r_{est}[i]$ indicates a predicted reception rate from $t_p[i]$ to $t_p[i-1]$, R is the average value of $r_{est}$ and indicates the average value of the values of $r_{est}$ that are calculated up to the previous frame calculated, and α indicates a weight factor and can be set to, for example, 0.9).

The AMP control unit 130 can apply the predicted reception rate $r_{est}[i]$ to Equation 15 to calculate the buffer level $b_{est}[j+w]$ of a (j+w)-th frame.

Then, in order to determine a playout discontinuity model, the AMP control unit 130 determines whether the buffer underflows or overflows by estimation, on the basis of the predicted buffer level (Step 723). That is, the AMP control unit 130 predicts the playout pause or skip of the current j-th frame on the basis of the predicted buffer level. When the buffer underflow is predicted, the AMP control unit 130 can predict the pause of the frame. When the buffer overflow is predicted, the AMP control unit 130 can predict the skip of the frame.

Specifically, When the predicted buffer level $b_{est}[j+w]$ is referred to as b[k] in Equation 14, the buffer underflow means that there is no frame that can be played out in the current buffer. When b[k] is smaller than S/fps as in Equation 14, the AMP control unit 130 can determine that the buffer underflow occurs, and determine to apply a discontinuity model such as playout pause. Similarly, when the predicted buffer level $b_{est}[j+w]$ is referred to as b[k] in Equation 14, the buffer overflow means that a frame loss occurs in the buffer since a playout side does not take out frame data from the buffer even though the buffer level exceeds buffer capacity. Therefore, when b[k] is larger than bs–S/fps, the AMP control unit 130 can determine that the buffer overflow occurs, and determine to apply a discontinuity model such as playout pause.

When the buffer underflow is predicted, the AMP control unit 130 calculates the maximum value $AMP_{max}$ and the minimum value $AMP_{min}$ of an AMP factor value, which is a parameter for controlling the playout rate during playout pause, according to the predicted buffer level (Step 724). Specifically, the maximum value of the AMP factor value during playout pause can be calculated by Equation 13 (Step 724-1). Assuming that the predicted buffer level $b_{est}[j+w]$ is b[k], the minimum value of the AMP factor value during playout pause can be calculated by substituting the predicted buffer level $b_{est}[j+w]$ in Equation 16 (Step 724-2). The calculated maximum and minimum values of the AMP factor value during playout pause are returned (Step 724-3). When Equation 2 is used to calculate the maximum value $AMP_{max}$ and the minimum value $AMP_{min}$ of the AMP factor value during playout pause, it is possible to calculate the maximum and minimum values of the playout rate during playout pause.

When the buffer overflow is predicted, the AMP control unit calculates the maximum value $AMP_{max}$ and the minimum value $AMP_{min}$ of an AMP factor value, which is a parameter for controlling the playout rate during playout skip, according to the predicted buffer level (Step 725). Specifically, assuming that the predicted buffer level $b_{est}[j+w]$ is b[i], the maximum value of the AMP factor value during playout skip can be calculated by substituting the predicted buffer level $b_{est}[j+w]$ in Equation 20 (Step 725-1). The minimum value of the AMP factor value during playout skip can be calculated by Equation 21 (Step 725-2). The calculated maximum and minimum values of the AMP factor value during playout skip are returned (Step 725-3). When Equation 2 is used to calculate the maximum value $AMP_{max}$ and the minimum value $AMP_{min}$ of the AMP factor value during playout skip, it is possible to calculate the maximum and minimum values of the playout rate during playout skip.

The playout interval of the current j-th frame is calculated on the basis of the calculated maximum and minimum values of the AMP factor value (Step 726). That is, a playout interval for playing out the current j-th frame is calculated on the basis of the playout rate during the playout pause or skip of the predicted frame. For example, an intermediate value between the calculated maximum and minimum values the AMP factor value may be determined as an AMP factor value $\Delta_p[j]$, and Equation 20 may be used to calculate the playout interval of the current j-th frame. Alternatively, the playout interval may be calculated by methods other than the method using the intermediate value. For example, a predetermined weight may be assigned to the maximum and minimum values of the AMP factor value, and the resultant value may be determined as the AMP factor value $\Delta_p[j]$, thereby determining the playout interval. In this case, as the playout interval increases, the playout rate decreases. As the playout interval decreases, the playout rate increases When neither the buffer underflow nor the buffer overflow occurs, the playout interval of the current j-th frame is set to zero (Step 727). As a result, the calculated playout interval is returned (Step 728).

3. Performance Evaluation 3.1 Simulation Environment

FIG. 11 is a conceptual diagram illustrating simulation topology for evaluating the performance of the buffer-based adaptive media playout method according to the embodiment of the invention. In FIG. 11, nodes 0 and 34 indicate video transmitter and receiver, respectively. The node 0 streams a video source to the node 34. In this case, a source bit rate is 4.8 Mbps. In order to make network congestion, a node 77 transmits a 3 Mbps pareto traffic to a node 33 according to a simulation scenario. According to this condition, bottleneck occurs at nodes 2 and 10. The size $b_s$ of a receiver-side buffer is set to 4.8 Mbits. The threshold value $\Delta_{th}$ of the AMP factor value is set to 0.25.

In order to evaluate the performance under various network conditions, three congestion scenarios are used as shown in FIG. 12. FIG. 12 is a graph illustrating packets per frame measured in the receiver when the buffer-based adaptive media playout method according to the embodiment of the invention is simulated according to three scenarios.

In FIG. 12, a Y-axis indicates packets per frame (ppf) measured in the receiver, and an X-axis indicates a playout time line. The frame rate fps of a source video is set to 25. Therefore, the original packets per frame ($ppf_{origin}$) are 16 by Equation 23 given below:

$$ppf_{origin} = \frac{4.8 \text{ Mbits} \times 1000000}{25 fps \times 8 \text{ bits} \times 1500 \text{ bytes}} = 16 \qquad [\text{Equation 23}]$$

(where 1500 bytes are equal to the size of an RTP (real-time transport protocol) packet).

Therefore, r[i] used in Equation 15 can be calculated by ppf[i]*8*1500. In this case, ppf[i] indicates the number of packets received between $t_p[i]$ and $t_p[i-1]$. As shown in FIG. 12, ppf is changed on the basis of $ppf_{origin}$. In the scenario 1, a node 77 is set so as to generate pareto traffic at a time interval of 2 seconds. Similarly, in the scenario 2, the node 77 is set so as to generate pareto traffic at a time interval of 5 seconds, and in the scenario 3, the node 77 is set so as to generate pareto traffic at a time interval of 20 seconds.

Comparison among the performances of the three methods will be described below. In the first method (without AMP), the AMP technique is not applied. The second method (TH-based AMP) is the existing buffer-threshold-based AMP to which two threshold values LWM and HWM are applied. In this method, when the buffer level is out of the threshold value range, the maximum threshold value $\Delta_{th}$ is applied. Simulation is performed under various threshold values LWM and HWM in order to compare the performances according to the threshold values. The third method corresponds to the buffer-based adaptive media playout method (proposed AMP) according to the embodiment of the invention. In the third method, simulation is performed while changing the window size w.

3.2 Simulation Results

FIG. 13 is a graph illustrating the RMSE values of the playout discontinuity measured in the receiver when the buffer-based adaptive media playout method according to the embodiment of the invention is simulated according to three scenarios. In the scenario 1, the lower threshold value LWM of the second method (TH-based AMP) is 0.3 sec, the upper threshold value HWM thereof is 0.7 sec, and the window size w of the third method, which is the buffer-based adaptive media playout method according to the embodiment of the invention, is 37. In the scenario 2, the lower threshold value LWM of the second method (TH-based AMP) is 0.1 sec, the upper threshold value HWM thereof is 0.9 sec, and the window size w of the third method, which is the buffer-based adaptive media playout method according to the embodiment of the invention, is 25. In the scenario 3, the lower threshold value LWM of the second method (TH-based AMP) is 0.2 sec, the upper threshold value HWM thereof is 0.8 sec, and the window size w of the third method, which is the buffer-based adaptive media playout method according to the embodiment of the invention, is 12. As can be seen from FIG. 13, for the three scenarios, the buffer-based adaptive media playout method according to the embodiment of the invention has the smallest RMSE of the playout discontinuity.

FIGS. 14 to 16 are graphs illustrating buffer levels and AMP factor values measured in the receiver when the buffer-based adaptive media playout method according to the embodiment of the invention is simulated according to the scenarios 1 to 3.

As can be seen from FIGS. 14 to 16, in the second method (TH-based AMP), AMP control is performed according to the buffer level, and the AMP factor has only three values of 0.25, 0, and −0.25. However, in the buffer-based adaptive media playout method according to the embodiment of the invention, since AMP control is performed according to an AMP control algorithm, the AMP factor value is dynamically changed.

FIG. 17 is a graph illustrating the RMSE values of the playout discontinuity measured in the receiver when the buffer-based adaptive media playout method according to the related art and the buffer-based adaptive media playout method according to the embodiment of the invention are simulated according to three scenarios while changing the buffer threshold value and the window size w. As can be seen from FIG. 17, in the first scenario 1, when LWM is 120, the RMSE of the playout discontinuity in the TH-based AMP method has the minimum value, and as LWM increases from 16 to 120, the RMSE of the playout discontinuity decreases gradually. However, when LWM is 180, the RMSE of the playout discontinuity increases suddenly. In addition, the RMSEs are different in the threshold values in the scenarios 2 and 3. As can be seen from FIG. 17, in the buffer-based adaptive media playout method according to the embodiment of the invention, the RMSE of the playout discontinuity depends on the window size w, and is smaller than that of the playout discontinuity in the TH-based AMP method.

FIG. 18 is a graph illustrating average playout rates measured in the receiver when the buffer-based adaptive media playout method according to the related art and the buffer-based adaptive media playout method according to the embodiment of the invention are simulated according to three scenarios while changing the buffer threshold value and the window size w. FIG. 19 is a graph illustrating delay values measured in the receiver when the buffer-based adaptive media playout method according to the related art and the buffer-based adaptive media playout method according to the embodiment of the invention are simulated according to three scenarios while changing the buffer threshold value and the window size w.

As can be seen from FIG. 18, in the buffer-based adaptive media playout method according to the embodiment of the invention, the average playout rate has a stable value regardless of a variation in the window size w, as compared to the TH-based AMP method. The TH-based AMP method according to the related art can obtain a higher average playout rate than the buffer-based adaptive media playout method according to the embodiment of the invention, according to the lower buffer threshold value LWM, but has a larger variation in the average playout rate according to the lower buffer threshold value than the buffer-based adaptive media playout method according to the embodiment of the invention. Similarly, as can be seen from FIG. 19, in the buffer-based adaptive media playout method according to the embodiment of the invention, the delay value is more stable than that in the TH-based AMP method according to the related art.

FIG. 20 is a graph illustrating the performances of the playout methods according to the related art and the buffer-based adaptive media playout method according to the embodiment of the invention when the methods are simulated according to three scenarios. FIG. 20 shows the average and the standard deviation of the results of the TH-based AMP method and the buffer-based adaptive media playout method according to the embodiment of the invention shown in FIGS. 17 to 19. The performance of the TH-based AMP method according to the related art depends on LWM and HWM. For example, assuming that LWM and HWM are set to the half of $b_s$, the playout rate is frequently changed in order to avoid the buffer overflow and the buffer underflow, and playout discontinuity is also increased due to frequent AMP control. Meanwhile, since the performance of the buffer-based adaptive media playout method according to the embodiment of the invention depends on the window size w, the selection of a proper window size w makes it possible to maximize the performance. As shown in FIG. 20, among the three methods, the buffer-based adaptive media playout method according to the embodiment of the invention has the smallest RMSE of playout discontinuity. In addition, among the three methods, the buffer-based adaptive media playout method according to the embodiment of the invention has the minimum standard deviation of the RMSE of the playout discontinuity. That is, the buffer-based adaptive media playout method according to the embodiment of the invention has a higher performance than the TH-based AMP method according to the related art regardless of the window size w.

The buffer-based adaptive media playout method according to the embodiment of the invention analyzes playout discontinuity, such as the playout pause and skip of frames, and defines a single playout discontinuity model that can be commonly applied to playout discontinuity during the playout pause and skip or all playout discontinuity without the playout pause and skip, on the basis of the analysis result of the playout discontinuity. The single playout discontinuity model is used to define an objective standard for the quality of intra-media synchronization using the RMSE of the playout discontinuity.

Further, the buffer-based adaptive media playout method according to the embodiment of the invention can use the defined playout discontinuity model to calculate the maximum and minimum values of the playout rate.

Furthermore, in order to calculate the maximum and minimum values of the playout rate, the buffer-based adaptive media playout method according to the embodiment of the invention predicts a buffer level that will come after a time period corresponding to the window size w from the current buffer level, and uses the predicted buffer level, instead of using the current buffer level.

In the above-mentioned embodiment, the buffer-based adaptive media playout method is applied to an intra-media synchronization technique for a video stream, but the buffer-based adaptive media playout method according to the invention can be applied to an audio stream. The playout rate of the audio stream may be controlled by a time-scale modification of audio technique.

Since the above-mentioned embodiment proposes a technique for, when the playout rate of a multimedia stream is changed, dynamically determining a parameter for the changed playout rate, the buffer-based adaptive media playout method according to the above-described embodiment can be commonly applied to various multimedia streams whose playout rate can be changed. However, threshold values for the variation range of the playout rate may be changed according to characteristics of streams and contents. For example, in the case of a video stream with little motion, the variation range of the playout rate may be extended, as compared to a video stream with a rapid motion. In addition, in the case of audio or voice streams, threshold values for the variation range of the playout rate may depend on a silent zone.

Meanwhile, the above-described embodiments of the invention can be incorporated into a computer readable program, and executed by a general-purpose digital computer that operates the program using a computer readable recording medium. The computer readable recording media include magnetic storage media (for example, a ROM, a floppy disk, and a hard disk), optical recording media (for example, a CD-ROM and a DVD), and a carrier wave (for example, transmission through the Internet).

EFFECTS OF THE INVENTION

The buffer-based adaptive media playout method according to the embodiment of the invention analyzes playout discontinuity, such as the playout pause and skip, and defines a single playout discontinuity model that can be commonly applied to playout discontinuity during the playout pause and skip or all playout discontinuity without the playout pause and skip, on the basis of the analysis result of the playout discontinuity. In addition, the defined playout discontinuity model is used to calculate the maximum and minimum values of the playout rate. Further, the buffer level of a (j+w)-th frame is predicted from the current j-th frame, and when playout pause and skip are predicted from the predicted buffer level, an AMP factor value is dynamically adjusted on the basis of the playout discontinuity model to perform the playout rate.

Therefore, it is possible to reduce the amount of temporal distortion, such as the RMSE value of playout discontinuity due to delay or jitter, as compared to the buffer-threshold-based media playout methods according to the related art.

Although the embodiments of the invention have been described above, it will be apparent to those skilled in the art that various modifications and changes may be made without departing from the scope and spirit of the present invention. Therefore, it should be understood that the above embodiments are not limitative, but illustrative in all aspects. The scope of the present invention is defined by the appended claims rather than by the description preceding them, and therefore all changes and modifications that fall within metes and bounds of the claims, or equivalents of such metes and bounds are therefore intended to be embraced by the claims.

What is claimed is:

1. A buffer-based adaptive media playout method in a receiver side of a network media streaming system, the method comprising:
    calculating a playout interval for playing out a current j-th frame (where j is a natural number) of a received media stream; and
    playing out the current j-th frame after the calculated playout interval has elapsed from the reception of the current j-th frame,
    wherein the calculating of the playout interval for playing out the current j-th frame of the received media stream includes:
    calculating a buffer level of a (j+w)-th frame (where w is a natural number);
    predicting a playout pause or a playout skip of the current j-th frame on the basis of the calculated buffer level; and
    calculating the playout interval for playing out the current j-th frame on the basis of a play out rate control parameter for the predicted one of the playout pause and the playout skip,
    wherein, in the calculating of the buffer level of the (j+w)-th frame, a weight is applied to an average reception rate of the media stream and a reception rate between the playout time of a (j−1)-th frame and the playout time of a (j−2)-th frame to calculate the predicted reception rate.

2. The method of claim 1,
    wherein, in the calculating of the buffer level of the (j+w)-th frame, the buffer level is calculated by computing a predetermined predicted reception rate of the j-th frame.

3. The method of claim 1,
    wherein, in the estimating of the playout pause or the playout skip on the basis of the calculated buffer level, when underflow occurs in the calculated buffer level, the playout pause is predicted, and when overflow occurs in the calculated buffer level, the playout skip is predicted.

4. The method of claim 1,
    wherein, in the calculating of the playout interval for playing out the current j-th frame for the predicted one of the playout pause and the playout skip on the basis of the playout rate control parameter, the playout interval for playing out the current j-th frame is calculated on the basis of maximum and minimum values of the playout rate control parameter during the predicted playout pause or maximum and minimum values of the playout rate control parameter during the predicted playout skip.

5. The method of claim 4,
    wherein the playout rate control parameter is determined by an intermediate value between the maximum and minimum values calculated according to the buffer level.

6. The method of claim 5,
    wherein, when there is no underflow or overflow in the calculated buffer level, the playout interval for playing out the current j-th frame is set to zero.

7. The method of claim 1, further comprising:
    calculating the playout interval from a (j+1)-th frame subsequent to the current j-th frame to the last frame of the received media stream, and playing out the frames.

8. At least one nontransitory processor readable medium including a program for allowing a computer to execute the buffer-based adaptive media playout method in a receiver side of a network media streaming system of claim 1.

9. An adaptive media playout apparatus comprising:
    a playout buffer that stores media packets received from a network;

a video decoder that decodes the media packets stored in the playout buffer; and an adaptive media playout control unit that predicts a playout pause and a playout skip of a current j-th frame on the basis of a buffer level of a (j+w)-th frame (where j and w are natural numbers) of the decoded media packets, and calculates a playout interval for playing out current j-th frame on the basis of a playout rate control parameter for the predicted one of the playout pause and the playout skip, wherein the buffer level of the (j+w)-th frame is calculated by computing a predetermined predicted reception rate of the i-th frame, when underflow occurs in the calculated buffer level, the adaptive media playout control unit predicts the playout pause, and when overflow occurs in the calculated buffer level, the adaptive media playout control unit predicts the playout skip.

10. The adaptive media playout apparatus of claim 9, wherein the adaptive media playout control unit calculates the playout interval for playing out the current j-th frame on the basis of maximum and minimum values of the playout rate control parameter during the predicted playout pause or maximum and minimum values of the playout rate control parameter during the predicted playout skip.

11. The adaptive media playout apparatus of claim 10, wherein the playout rate control parameter is determined by an intermediate value between the maximum and minimum values calculated according to the buffer level.

* * * * *